United States Patent
Tang et al.

(10) Patent No.: US 8,923,326 B2
(45) Date of Patent: Dec. 30, 2014

(54) HIGH-DEFINITION MULTIMEDIA INTERFACE COPPER ADAPTER

(75) Inventors: Norman Tang, Los Altos, CA (US);
Liang Ping Peng, Santa Clara, CA (US);
David Lai, Mountain View, CA (US);
Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 13/403,312

(22) Filed: Feb. 23, 2012

(65) Prior Publication Data

US 2013/0222688 A1    Aug. 29, 2013

(51) Int. Cl.
*H04N 7/01* (2006.01)

(52) U.S. Cl.
USPC ............................ 370/466; 348/441

(58) Field of Classification Search
USPC .................... 370/463, 466; 348/441
See application file for complete search history.

(56) References Cited

U.S. PATENT DOCUMENTS

| | | | |
|---|---|---|---|
| 7,340,769 B2 | 3/2008 | Baugher | |
| 2008/0069052 A1* | 3/2008 | Mezer et al. | 370/332 |
| 2009/0052208 A1* | 2/2009 | Li | 363/13 |
| 2009/0154467 A1* | 6/2009 | Diab | 370/395.4 |
| 2009/0257754 A1 | 10/2009 | Theodoras, II et al. | |
| 2010/0111100 A1* | 5/2010 | Baumer | 370/465 |
| 2010/0316068 A1* | 12/2010 | Ornes et al. | 370/476 |
| 2012/0071011 A1* | 3/2012 | Kagan et al. | 439/76.1 |

OTHER PUBLICATIONS

Specific requirements Part 3: Carrier Sense Multiple Access with Collision Detection (CSMA/CD) Access Method and Physical Layer Specifications Amendment 1: Physical Layer and Management Parameters for 10GBASE-T, Sep. 1, 2006, IEEE, All Pages.*

* cited by examiner

*Primary Examiner* — Curtis A Alia
(74) *Attorney, Agent, or Firm* — Edell, Shapiro & Finnan, LLC

(57) ABSTRACT

Techniques are provided for communications between high-definition multimedia interface (HDMI) devices. The techniques describe a system comprising a first or transmitter adapter device that is electrically connected to a source HDMI device. The first adapter device is configured to receive one or more source HDMI signals from the source device across a first HDMI link and to convert the source HDMI signals to corresponding one or more 10GBase-T data signals configured to be transmitted across a data link. A second or receiver adapter device electrically connected to the first adapter device across the data link. The second adapter device is configured to receive the 10GBase-T data signals from the first adapter device across the data link, convert the 10GBase-T data signals to corresponding one or more destination HDMI signals and send the destination HDMI signals to a destination HDMI device electrically connected to the second adapter device.

20 Claims, 5 Drawing Sheets

HIGH-DEFINITION MULTIMEDIA INTERFACE COPPER ADAPTER

TECHNICAL FIELD

The present disclosure relates to enhanced communications between audio and video devices.

BACKGROUND

High-definition multimedia interface (HDMI) enabled devices are increasingly deployed in audio/video environments. HDMI devices deliver HDMI signals that are digital counterparts to traditional analog audio/video signals. These audio/video signals are increasingly being transmitted at higher bit rates. For example, devices are configured to deliver video content comprising ten gigabit Ethernet ("10G") signals. Due to well known HDMI cable distance limitation problems, numerous HDMI extenders are currently available. Some extenders require two registered jack (RJ) 45 cables extending up to 360 feet or a single RJ45 cable extending up to 160 feet. These extenders are based on signal conditioning technology and threaten to become obsolete, since they fail to meet the latest HDMI data speed requirements.

DESCRIPTION OF EXAMPLE EMBODIMENTS

Overview

Techniques are provided for communications between high-definition multimedia interface (HDMI) devices. The techniques describe a system comprising a first or transmitter adapter device that is electrically connected to a source HDMI device. The first adapter device is configured to receive one or more source HDMI signals from the source device across a first HDMI link and to convert the source HDMI signals to corresponding one or more 10GBase-T data signals configured to be transmitted across a data link. A second or receiver adapter device is electrically connected to the first adapter device across the data link. The second adapter device is configured to receive the 10GBase-T data signals from the first adapter device across the data link, convert the 10GBase-T data signals to corresponding one or more destination HDMI signals and send the destination HDMI signals to a destination HDMI device electrically connected to the second adapter device.

Example Embodiments

Figure 1:
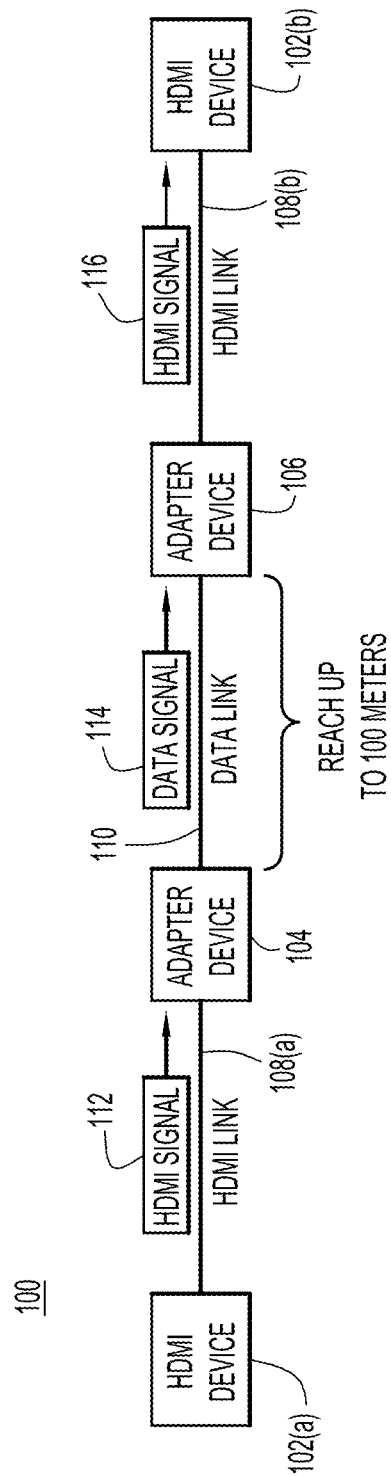
FIG. 1 is an example topology depicting a plurality of high-definition multimedia interface (HDMI) devices and a plurality of adapter devices coupled to the HDMI devices to enable audio and video communications between the HDMI devices.

The techniques described herein are directed to extending the transmission distance (e.g., "reach") for communications between high-definition multimedia interface (HDMI) devices. An example topology 100 is illustrated in FIG. 1. The topology 100 has a plurality of HDMI devices, shown at reference numerals 102(*a*) and 102(*b*). The topology 100 also has a plurality of adapter devices, shown at reference numerals 104 and 106. As shown, each of the HDMI devices 102(*a*) and 102(*b*) is electrically connected to a corresponding one of the adapter devices 104 and 106. The HDMI devices 102(*a*) and 102(*b*) are connected to the corresponding adapter devices 104 and 106 across corresponding HDMI links, shown at reference numerals 108(*a*) and 108(*b*). The adapter devices 104 and 106 are electrically connected to each other, across a data link 110. It should be appreciated that though topology 100 shows two HDMI devices and two adapter devices, topology 100 may comprise any number of HDMI device and adapter devices configured to send and receive HDMI signals according to the techniques described herein. Additionally, any number of HDMI links and data links may be present in topology 100.

Each of the HDMI devices 102(*a*) and 102(*b*) may be any device configured to send and receive HDMI signals. For example, the HDMI devices 102(*a*) and 102(*b*) may be high-definition (HD) television displays, HDMI enabled cameras, computers, laptops, tablets, smartphones, digital video disc (DVD) players (e.g., Blu-ray, HD-DVD, etc.), gaming devices, etc. configured to send and/or receive HDMI signals across the HDMI links 108(*a*) and 108(*b*). For example, a source HDMI device is configured to send HDMI signals ultimately destined for a destination HDMI device. Likewise, the destination HDMI device is configured to receive HDMI signals originating from the source HDMI device. It should be appreciated that the HDMI device 102(*a*) and the HDMI device 102(*b*) may operate as either a source HDMI device or a destination HDMI device. For simplicity, the HDMI device 102(*a*) is referred to and described hereinafter as a source HDMI device 102(*a*), and the HDMI device 102(*b*) is referred to and described hereinafter as a destination HDMI device 102(*b*).

Each of the adapter devices 104 and 106 may be any device that is configured to send and receive HDMI signals and to send and receive data signals. Additionally, the adapter devices 104 and 106 are configured to convert HDMI signals to data signals and to convert data signals to HDMI signals. For example, a transmitter adapter device is configured to receive HDMI signals from a source HDMI device, to convert the HDMI signals to data signals and to send the data signals to a receiver adapter device across a data link. Likewise, the receiver adapter device is configured to receive the data signals from the transmitter adapter device, to convert the data signals to HDMI signals and to send the HDMI signals to a destination device. The adapter device 104 and the adapter device 106 may be configured as either a transmitter adapter device or a receiver adapter device. For simplicity, the adapter device 104 is referred to hereinafter as a transmitter or first adapter device 104, and the adapter device 106 is referred to hereinafter as a receiver or second adapter device 106.

The first adapter device 104 and the second adapter device 106 may be configured to send and receive different families of data signals. For example, the first adapter device 104 may be configured to convert HDMI signals into signals compliant with the ten gigabit Ethernet standard ("10G" or "10G signals"). Likewise, the second adapter device 104 may be configured to receive the 10G signals from the first adapter device 102 and to convert the 10G signals into HDMI signals. In one example, the 10G signals may be 10G signals in compliance with the Institute of Electrical and Electronic Engineers (IEEE) 802.3an-2006 standard (commonly referred to as "10GBase-T signals"). By converting the HDMI signals to data signals and transmitting these data signals over the data link 110, the techniques described herein enable the source HDMI device 102(a) to increase the transmission reach for HDMI signals sent to the destination device 104(a).

HDMI communications may be sent from the source HDMI device 102(a) to the destination HDMI device 102(b) (e.g., "source-to-destination communications"). HDMI communications may also be sent from the destination HDMI device 102(b) to the source HDMI device 102(a) (e.g., "destination-to-source communications"). For simplicity, FIG. 1 shows an example of the source-to-destination communications, and these communications are described herein. It should be appreciated that the techniques described herein are also applicable for destination-to-source communications.

In FIG. 1, the source HDMI device 102(a) transmits (or sends) a first HDMI signal (or "source HDMI signal") 112 to the first/transmitter adapter device 104 across the HDMI link 108(a) (e.g., "first HDMI link"). Upon receiving the first HDMI signal 112, the first adapter device 104 converts the received HDMI signal into a data signal 114 and transmits the data signal 114 across the data link 110 to the second/receiver adapter device 106, according to the techniques described herein.

The second adapter device 106, upon receiving the data signal 114, converts the data signal 114 into a second HDMI signal (or "destination HDMI signal") 116. The second adapter device 106 sends the second HDMI signal 116 to the destination device 102(b) across the HDMI link 108(b) (e.g., "second HDMI link"). Thus, as described by the techniques herein, the destination HDMI device 102(b) receives the second HDMI signal 116 which, e.g., carries the same or substantially similar content (e.g., audio, video and data content) as the first HDMI signal 112 originally sent from the source HDMI device 102(a). It should be appreciated that the source HDMI device 102(a) may transmit or send multiple first HDMI signals, and that these first HDMI signals may be converted into corresponding multiple data signals and second HDMI signals.

Figure 2:
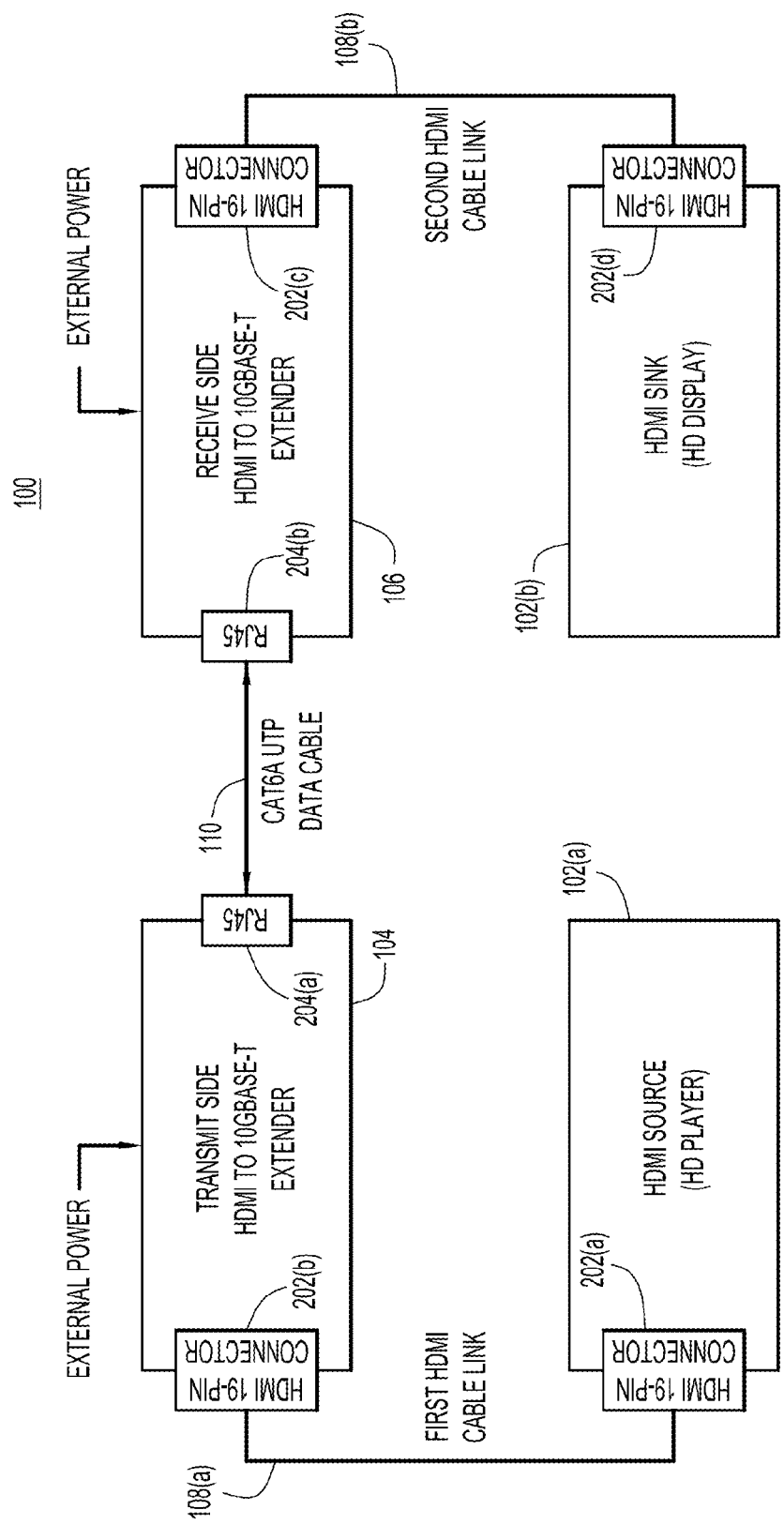
FIG. 2 is an example topology showing the HDMI devices and the adapter devices configured with interface units to enable the communications.

Reference is now made to FIG. 2. FIG. 2 shows the topology 100 comprising the source HDMI device 102(a) and the destination HDMI device 102(b) configured to interface with respective first and second adapter devices 104 and 106. As shown, the source HDMI device 102(a) (e.g., a Blu-ray player, computer, gaming device, etc.) is electrically connected to the first adapter device 104 via the first HDMI link 108(a), which is depicted in FIG. 2 as a first HDMI cable link. The source HDMI device 102(a) has an HDMI connector unit 202(a) that is configured to interface with a first end of the first HDMI cable link. A second end of the first HDMI cable link is configured to interface with an HDMI connector unit 202(b) located on the first adapter device 104. In one example, the HDMI connector units 202(a) and 202(b) are 19-pin HDMI connector units. Thus, the source HDMI device 102(a) sends or transmits the first HDMI signal 112 to the first adapter device 104 from the HDMI connector 202(a) across the first HDMI cable link.

The first adapter device 104 receives the first HDMI signal 112 from the source HDMI device 102(a) across the first HDMI cable link. The first adapter device 104 is shown in FIG. 2 as an HDMI to 10GBase-T extender device. In other words, the first adapter device 104 is, for example, an adapter device configured to convert the first HDMI signal 112 to the data signal 114 comprising a 10GBase-T signal. It should be appreciated that the adapter device may be configured to convert the first HDMI signal 112 to the data signal 114 comprising other data signals, for example, in compliance with the 10G Ethernet standard. For simplicity, the data signal 114 is referred to hereinafter as a 10GBase-T signal. The first adapter device 104 has the HDMI connector unit 202(b) that is configured to interface with a second end of the first HDMI cable link, as described above, though it should be appreciated that the HDMI connector unit 202(b) can interface with the first end of the first HDMI cable link and that the HDMI connector unit 202(a) can interface with the second end of the first HDMI cable link.

Additionally, the first adapter device 104 has a data connector unit 204(a) that is configured to interface with the data link 110, shown in FIG. 2 as a category 6-A (CAT6A) unshielded twisted pair (UTP) data cable. The CAT6A UTP data cable may be configured to carry the 10GBase-T signal that is converted from the first HDMI signal 112 by the first adapter device 104, as described herein. For example, the CAT6A UTP cable may carry the 10GBase-T signal from the first adapter device 104 to the second adapter device 106. The data connector unit 204(a) is, for example, a registered jack (RJ) 45 connector that is configured to interface with the CAT6A UTP data cable. It should be appreciated that any data cable configured to carry appropriate data signals (e.g., the 10GBase-T signal) may be used as the data link 110.

The second adapter device 106 is shown in FIG. 2 as a 10GBase-T to HDMI extender device. In other words, the second adapter device 106 is, for example, an adapter device configured to convert the 10GBase-T signal to the second HDMI signal 114. The second adapter device 106 converts the 10GBase-T signal to the second HDMI signal 114 such that the second HDMI signal comprises the same or substantially similar audio, video and data content as the first HDMI signal 112. The second adapter device 106 has a data connector unit 204(b) that is configured to interface with the CAT6 UTP data cable to receive the data signal 114 from the first adapter device 104.

The second adapter device 106 also has an HDMI connector unit 202(c) which, for example, is similar to the HDMI connector units 202(a) and 202(b). The second adapter device 106 is electrically connected to the destination HDMI device 102(b) via the second HDMI link 108(b), which is depicted as a second HDMI cable link. The HDMI connector unit 202(c) is configured to interface with a first end of the second HDMI cable link. A second end of the second HDMI cable link interfaces with an HDMI connector 202(d) on the destination HDMI device 102(b). The second adapter 106 sends the second HDMI signal 116 to the destination HDMI device 102(b) across the second HDMI cable link.

The destination HDMI device 102(b) (e.g., an HD television display) receives the second HDMI signal 116 across the second HDMI cable link and processes the second HDMI signal 116. For example, the destination endpoint HDMI device 102(b) displays HDMI signals comprising audio, video and data signals sent from the source HDMI device 102(a).

Though not shown in FIG. 2, one or more power units are configured to provide power to the first adapter device 104 and the second adapter device 106. This enables the first adapter device 104 and the second adapter device 106 to perform the converting operations, as described herein.

Figure 3:
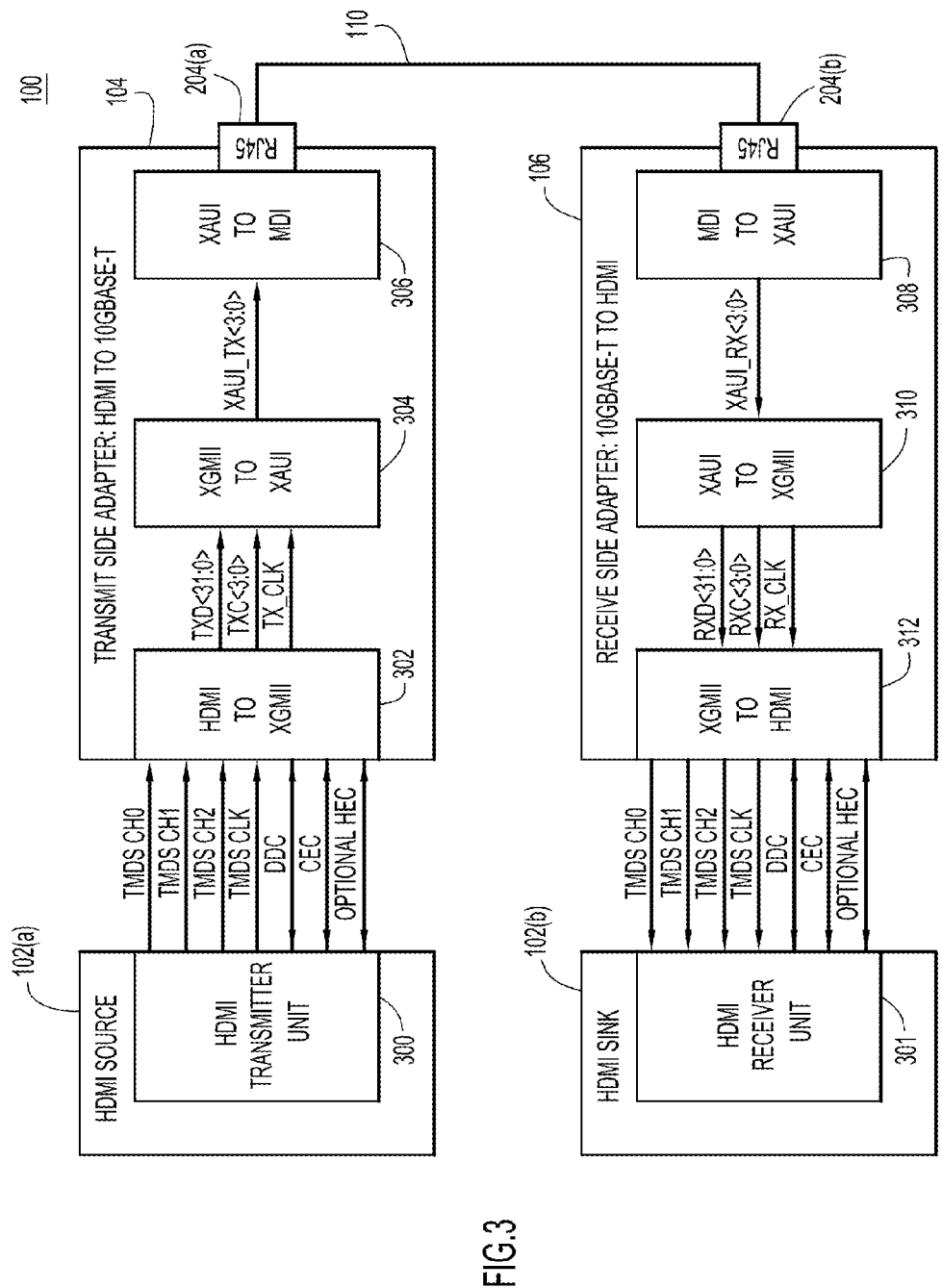
FIG. 3 is an example data path between the HDMI devices and the adapter devices.

Reference is now made to FIG. 3, which shows an example data path between the source HDMI device 102(a), having an HDMI transmitter unit 300, and the destination HDMI device 102(b), having an HDMI receiver unit 301. As stated above, the source HDMI device 102(a) is configured to send the first HDMI signal 112 to the first adapter device 104. As shown in FIG. 3, the first adapter device 104 comprises a plurality of transmitter converting units to convert the first HDMI signal 112 to the 10GBase-T data signal 114. Specifically, the first adapter device 104 has a first transmitter converting unit 302, a second transmitter converting unit 304 and a third transmitter converting unit 306. The first transmitter converting unit 302 is configured to receive the first HDMI signal 112 from the source HDMI device 102(a) via, e.g., the HDMI link 108(a). The first transmitter converting unit 302 is configured to convert the first HDMI signal 112 to a ten gigabit media independent interface (XGMII) signal. The first transmitter converting unit 302 is electrically connected to the second transmitter converting unit 304, which is configured to receive the XGMII signal from the first transmitter converting unit 302 and is configured to convert the XGMII signal into a ten gigabit attachment unit interface (XAUI) signal. The second transmitter converting unit 304 is electrically connected to the third transmitter converting unit 306, which is configured to receive the XAUI signal from the second transmitter converting unit 304. The third transmitter converting unit 306 is configured to convert the XAUI signal into a 10GBase-T data signal (e.g., a 10GBase-T medium dependent interface (MDI) signal) to be sent over the data link 110 via the data connector 204(a).

It should be appreciated that as the first HDMI signal 112 is converted to the 10GBase-T signal, each of the intermediate conversions (e.g., the HDMI-to-XGMII conversion, the XGMII-to-XAUI conversion and the XAUI-to-10GBase-T conversion) retain the same or substantially the same audio, video and data information of the first HDMI signal 112. Additionally, it should be appreciated that conversions in the first adapter device 104 shown in FIG. 2 are simply example conversions from the first HDMI signal 112 to the 10GBase-T signal and that any techniques using any number of converting units may be used for accomplishing this conversion. It may, however, be preferable for the first HDMI signal 112 to undergo the conversion to the XGMII signal, for this XGMII signal to undergo the conversion to the XAUI signal, and for the XAUI signal to undergo the conversion to the 10GBase-T data signal, since existing commercially available converting units may be used to process the conversions. Furthermore, it should be appreciated that these conversion techniques may be performed by hardware, software or a combination of hardware and software in the first adapter device 104.

As stated above, the second adapter device 106 receives the 10GBase-T data signal 114 over the data link 110 at the data connector 204(b) of the second adapter device 106. The second adapter device 106 comprises a plurality of receiver converting units to convert the 10GBase-T data signal 114 to the second HDMI signal 116. Specifically, the second adapter device 106 has a first receiver converting unit 308, a second receiver converting unit 310 and a third receiver converting unit 312. The first receiver converting unit 308 is configured to convert the received 10GBase-T data signal 114 into a XAUI signal. The first receiver converting unit 308 is electrically connected to the second receiver converting unit 310, which is configured to receive the XAUI signal from the first receiver converting unit 308 and is configured to convert the XAUI signal into a XGMII signal. The second receiver converting unit 310 is electrically connected to the third receiver converting unit 312, which is configured to receive the XGMII signal from the second receiver converting unit 310 and is configured to convert the XGMII signal to the second HDMI signal 116. The second HDMI signal 116 is then sent to the destination HDMI device 102(b) across the second HDMI link 108(b).

As stated above, when the 10GBase-T data signal 114 is converted to the second HDMI signal 116, each of the intermediate conversions (e.g., the 10GBase-T-to-XAUI conversion, the XAUI-to-XGMII conversion and the XGMII-to-HDMI conversion) retain the same or substantially the same audio, video and data information of the first HDMI signal 112. Additionally, the conversions in the second adapter device 106 are simply example conversions from the 10GBase-T data signal to the second HDMI signal 116 and that any techniques using any number of converting units may be used for accomplishing this conversion. Also, similar to the first adapter device 104, it should be appreciated that these conversion techniques may be performed by hardware, software or a combination of hardware and software in the second adapter device 106.

Once the first HDMI signal 112 has been converted to the 10GBase-T data signal, the 10GBase-T data signal can be transmitted across the data link 110 at distances acceptable under the 10GBase-T standard. For example, the 10GBase-T standard enables data signals to be transmitted at distances of up to 100 meters at a data rate of approximately ten gigabits per second. In contrast, HDMI signals can typically be transmitted over much smaller distances across HDMI links. For example, commercially available HDMI extenders (e.g., registered jack (RJ) 45 extenders) may be configured to transmit HDMI signals over HDMI links for about 160 feet prior to signal or data rate degradation. Additionally, some extenders require two RJ 45 cables extending up to 360 feet for Enhanced-Definition Television (EDVT) or 480p video display resolution only. Furthermore, existing extenders utilize various signal equalization methods that require two RJ45 ports, and these solutions can achieve transmission reach distances of only 60 meters distance at 2.25 gigabits per second of the transmission minimized differential signaling (TMDS) bandwidth.

The techniques described herein allow HDMI signals to be transmitted at increased reach distances while maintaining signal quality and signal transmission rates of HDMI signals, e.g., signals for High-Definition Television (HDTV) 1920× 1080p, 120 frame/second and 24 bit/pixel color depth video display resolution and other resolutions within 10.2 gigabit per second maximum TMDS bandwidth supported by the HDMI 1.3 and 1.4 standard. Transmission at these increased reach distances is accomplished by converting the HDMI signals to 10GBase-T or other similar data signals capable of being transmitted across the increased transmission distances. These techniques allow HDMI devices to exploit the reach capabilities of 10GBase-T data signals to drive 10G HDMI signals over large distances to other HDMI devices. In other words, the conversion techniques described herein import beneficial data transmission characteristics that exist in 10GBase-T data communication technologies to improve HDMI signal transmission.

Figure 4:
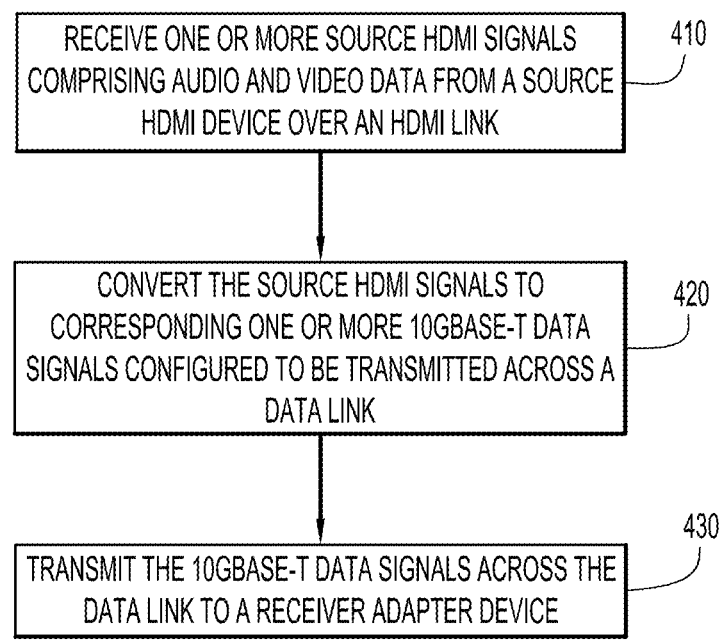
FIG. 4 is an example flow chart depicting operations performed by a transmitter adapter device configured to convert HDMI signals to 10GBase-T data signals.

Reference is now made to FIG. 4, which shows an example flow chart depicting operations performed by the first/transmitter adapter device 104. At operation 410, the transmitter adapter device 104 receives one or more source HDMI signals (e.g., the first/source HDMI signal 112) comprising audio and video data from the source HDMI device 102(a) over an HDMI link (e.g., the HDMI link 108(a)). The source HDMI signals, at operation 420, are converted to corresponding one or more 10GBase-T data signals (e.g., the data signal 114) configured to be transmitted across a data link (e.g., the data link 110). At operation 430, the 10GBase-T data signals are transmitted across the data link 110 to the receiver adapter device 106.

Figure 5:
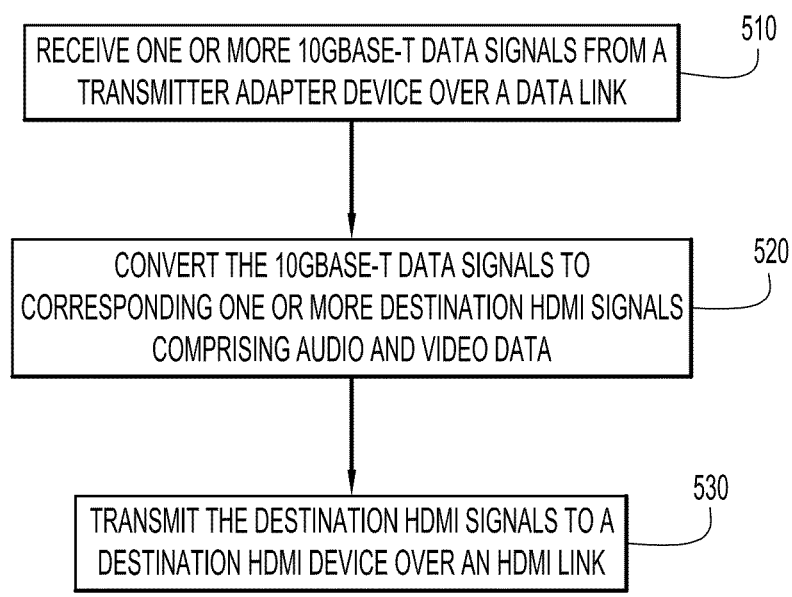
FIG. 5 is an example flow chart depicting operations performed by a receiver adapter device configured to convert 10GBase-T data signals to HDMI signals.

Reference is now made to FIG. 5, which shows an example flow chart depicting operations performed by the second/receiver adapter device 106. At operation 510, the receiver adapter device 106 receives one or more 10GBase-T data signals from the transmitter adapter device 104 over the data link 110. The 10GBase-T data signals, at operation 520, are converted to corresponding one or more destination HDMI signals (e.g., the second/destination HDMI signal 116) comprising audio and video data. At operation 530, the destination HDMI signals are transmitted to the destination HDMI device 102(b) over an HDMI link (e.g., the second HDMI link 108(b)).

It should be appreciated that the techniques described above in connection with all embodiments may be performed by one or more computer readable storage media that is encoded with software comprising computer executable instructions to perform the methods and steps described herein. For example, the operations performed by the first adapter 104 and the second adapter 106 may be performed by one or more computer or machine readable storage media or device executed by a processor and comprising software, hardware or a combination of software and hardware to perform the techniques described herein.

In sum, a system is provided comprising: a first adapter device electrically connected to a source high-definition multimedia interface (HDMI) device and configured to: receive one or more source HDMI signals from the source device across a first HDMI link; and convert the source HDMI signals to corresponding one or more 10GBase-T data signals configured to be sent across a data link; and a second adapter device electrically connected to the first adapter device across the data link and configured to: receive the 10GBase-T data signals from the first adapter device across the data link; convert the 10GBase-T data signals to corresponding one or more destination HDMI signals; and send the destination HDMI signals to a destination HDMI device electrically connected to the second adapter device.

Additionally, a method is provided comprising: at a transmitter adapter device, receiving one or more source high-definition multimedia interface (HDMI) signals comprising audio and video data from a source HDMI device over an HDMI link; converting the source HDMI signals to corresponding one or more 10GBase-T data signals configured to be sent across a data link; and sending the 10GBase-T data signals across the data link to a receiver adapter device.

Furthermore, a method is provided comprising: at a receiver adapter device, receiving one or more 10GBase-T data signals from a transmitter adapter device over a data link; converting the 10GBase-T data signals to corresponding one or more destination high-definition multimedia interface (HDMI) signals comprising audio and video data; and sending the destination HDMI signals to a destination HDMI device over an HDMI link.

In addition, an apparatus is provided comprising: a high-definition multimedia interface (HDMI) connector unit configured to receive one or more source HDMI signals comprising audio and video data from a source HDMI device across an HDMI link; one or more transmitter converting units configured to convert the source HDMI signals to corresponding one or more 10GBase-T data signals configured to be sent across a data link; and a transceiver unit configured to send the 10GBase-T data signals from a data connector unit across the data link to a receiver adapter device.

Additionally, an apparatus is provided comprising: a data connector unit configured to receive one or more 10GBase-T data signals from an adapter device across a data link; one or more receiver converting units configured to convert the 10GBase-T data signals to corresponding one or more destination high-definition multimedia interface (HDMI) signals configured to be sent across an HDMI link; and a transceiver unit configured to send the destination HDMI signals from a HDMI connector unit across the HDMI link to a destination HDMI device.

The above description is intended by way of example only. Various modifications and structural changes may be made therein without departing from the scope of the concepts described herein and within the scope and range of equivalents of the claims.

What is claimed is:

1. A system comprising:
a first adapter device electrically connected to a source high-definition multimedia interface (HDMI) device and configured to:
receive a source HDMI signal from the source HDMI device across a first HDMI link;
perform a first transmitter signal conversion to convert the source HDMI signal to a source ten gigabit media independent interface (XGMII) signal;
perform a second transmitter signal conversion to convert the source XGMII signal to a source ten gigabit attachment unit interface (XAUI) signal; and
perform a third transmitter signal conversion to convert the source XAUI signal to a 10GBase-T data signal that retains substantially similar audio and video data information as the source HDMI signal and that is configured to be sent across a data link, the data link comprising a twisted pair data cable; and
a second adapter device electrically connected to the first adapter device across the data link and configured to:
receive the 10GBase-T data signal from the first adapter device across the data link;
perform a first receiver signal conversion to convert the 10GBase-T data signal to a receiver XAUI signal;
perform a second receiver signal conversion to convert the receiver XAUI signal to a receiver XGMII signal;
perform a third receiver signal conversion to convert the receiver XGMII signal to a destination HDMI signal; and
send the destination HDMI signal to a destination HDMI device electrically connected to the second adapter device.

2. The system of claim 1, wherein the second adapter device is configured to convert the 10GBase-T data signal to the corresponding destination HDMI signal such that the destination HDMI signal contains audio and video data that is substantially similar to audio and video data of the source HDMI signal.

3. The system of claim 1, wherein the first adapter device is configured to convert the source HDMI signal to the 10GBase-T data signal that is compliant with the Institute of Electrical and Electronics Engineers (IEEE) 802.3an-2006 standard.

4. The system of claim 3, wherein the first adapter device is configured to send the 10GBase-T data signal across the data link at a transmission distance of up to 100 meters.

5. The system of claim 1, wherein the first adapter device is further configured to convert the source HDMI signal to the 10GBase-T data signal that is a 10GBaseT medium dependent interface (MDI) data signal.

6. The system of claim 5, wherein the second adapter device is configured to receive the 10GBase-T MDI data signal from the first adapter device over the data link and to convert the 10GBase-T MDI data signal to the corresponding destination HDMI signal.

7. A method comprising:
at a transmitter adapter device, receiving a source high-definition multimedia interface (HDMI) signal comprising audio and video data from a source HDMI device over an HDMI link;
performing a first transmitter signal conversion to convert the source HDMI signal to a source ten gigabit media independent interface (XGMII) signal;
performing a second transmitter signal conversion to convert the source XGMII signal to a source ten gigabit attachment unit interface (XAUI) signal;
performing a third transmitter signal conversion to convert the source XAUI signal to a 10GBase-T data signal that retains substantially similar audio and video data information as the source HDMI signal and that is configured to be sent across a data link, the data link comprising a twisted pair data cable; and
sending the 10GBase-T data signal across the data link to a receiver adapter device.

8. The method of claim 7, wherein sending comprises sending the 10GBase-T data signal across the data link to the receiver adapter device configured to convert the 10GBase-T data signal to a corresponding destination HDMI signal.

9. The method of claim 8, wherein performing the third transmitter signal conversion comprises converting the source XAUI signal to the 10GBase-T data signal that is compliant with the Institute of Electrical and Electronic Engineers (IEEE) 802.3an-2006 standard.

10. The method of claim 7, wherein sending comprises sending the 10GBase-T data signal across the data link at a transmission distance of up to 100 meters.

11. The method of claim 7, wherein performing the third transmitter signal conversion comprises converting the source XAUI signal to the 10GBase-T data signal that is a 10GBASE-T medium dependent interface (MDI) data signal.

12. A method comprising:
at a receiver adapter device, receiving a 10GBase-T data signal from a transmitter adapter device over a data link, the data link comprising a twisted pair data cable;
performing a first receiver signal conversion to convert the 10GBase-T data signal to a receiver ten gigabit attachment unit interface (XAUI) signal;
performing a second receiver signal conversion to convert the receiver XAUI signal to a receiver ten gigabit media independent interface (XGMII) signal;
performing a third receiver signal conversion to convert the receiver XGMII signal to a destination HDMI signal comprising audio and video data that retains substantially similar audio and video data information as the 10GBase-T data signal; and
sending the destination HDMI signal to a destination HDMI device over an HDMI link.

13. The method of claim 12, wherein receiving comprises receiving a 10GBase-T medium dependent interface (MDI) data signal.

14. An apparatus comprising:
a high-definition multimedia interface (HDMI) connector unit configured to receive a source HDMI signal comprising audio and video data from a source HDMI device across an HDMI link;
a first transmitter converter configured to perform a first transmitter signal conversion to convert the source HDMI signal to a source ten gigabit media independent interface (XGMII) signal;
a second transmitter converter configured to perform a second transmitter signal conversion to convert the source XGMII signal to a source ten gigabit attachment unit interface (XAUI) signal;
a third transmitter converter configured to perform a third transmitter signal conversion operation to convert the source XAUI signal to a 10GBase-T data signal that retains substantially similar audio and video data information as the source HDMI signal and that is configured to be sent across a data link, the data link comprising a twisted pair data cable; and
a transceiver unit configured to send the 10GBase-T data signal from a data connector unit across the data link to a receiver adapter device.

15. The apparatus of claim 14, wherein the apparatus is configured to convert the source HDMI signal to the 10GBase-T data signal that is compliant with the Institute of Electrical and Electronic Engineers (IEEE) 802.3an-2006 standard.

16. The apparatus of claim 14, wherein the transceiver unit is further configured to send the 10GBase-T data signal across the data link at a transmission distance of up to 100 meters.

17. The apparatus of claim 14, wherein the apparatus is configured to convert the source HDMI signal to a 10GBASE-T medium dependent interface (MDI) data signal.

18. An apparatus comprising:
a data connector unit configured to receive a 10GBase-T data signal from an adapter device across a data link, the data link comprising a twisted pair data cable;
a first receiver converter configured to perform a first receiver signal conversion to convert the 10GBase-T data signal to a receiver ten gigabit attachment unit interface (XAUI) signal;
a second receiver converter configured to perform a second receiver signal conversion to convert the receiver XAUI signal to a receiver ten gigabit media independent interface (XGMII);
a third receiver converter configured to perform a third receiver signal conversion to convert the receiver XGMII signal to a destination HDMI signal comprising audio and video data that retains substantially similar audio and video data information as the 10GBase-T data signal; and
a transceiver unit configured to send the destination HDMI signals from a HDMI connector unit across an HDMI link to a destination HDMI device.

19. The apparatus of claim 18, wherein the data connector unit is configured to receive a 10GBase-T medium dependent interface (MDI) data signal.

20. The apparatus of claim 18, wherein the data connector unit is configured to receive the 10GBase-T data signal from a transmission distance of up to 100 meters.

* * * * *